United States Patent
Attias et al.

(10) Patent No.: US 7,480,615 B2
(45) Date of Patent: Jan. 20, 2009

(54) METHOD OF SPEECH RECOGNITION USING MULTIMODAL VARIATIONAL INFERENCE WITH SWITCHING STATE SPACE MODELS

(75) Inventors: Hagai Attias, San Francisco, CA (US); Li Deng, Sammamish, WA (US); Leo Lee, Waterloo (CA)

(73) Assignee: Microsoft Corporation, Redmond, WA (US)

( * ) Notice: Subject to any disclaimer, the term of this patent is extended or adjusted under 35 U.S.C. 154(b) by 890 days.

(21) Appl. No.: 10/760,937

(22) Filed: Jan. 20, 2004

(65) Prior Publication Data

US 2005/0159951 A1 Jul. 21, 2005

(51) Int. Cl.
*G06F 17/20* (2006.01)
*G10L 15/14* (2006.01)
*G10L 15/00* (2006.01)
*G10L 15/28* (2006.01)
*G05B 15/00* (2006.01)

(52) U.S. Cl. .................. 704/240; 704/256; 704/243; 704/236; 704/231; 704/255; 700/29

(58) Field of Classification Search .......... 704/236, 704/240, 256, 243
See application file for complete search history.

(56) References Cited

U.S. PATENT DOCUMENTS

| | | | | |
|---|---|---|---|---|
| 5,027,406 A | * | 6/1991 | Roberts et al. | 704/244 |
| 5,202,952 A | * | 4/1993 | Gillick et al. | 704/200 |
| 5,778,341 A | * | 7/1998 | Zeljkovic | 704/256 |
| 5,864,810 A | * | 1/1999 | Digalakis et al. | 704/255 |
| 5,960,395 A | * | 9/1999 | Tzirkel-Hancock | 704/241 |
| 6,226,612 B1 | * | 5/2001 | Srenger et al. | 704/256.2 |
| 6,591,146 B1 | * | 7/2003 | Pavlovic et al. | 700/29 |
| 6,678,658 B1 | * | 1/2004 | Hogden et al. | 704/243 |
| 6,990,447 B2 | * | 1/2006 | Attias et al. | 704/240 |
| 2003/0088411 A1 | * | 5/2003 | Ma et al. | 704/236 |
| 2003/0093269 A1 | * | 5/2003 | Attias et al. | 704/226 |

OTHER PUBLICATIONS

Lee et al., "A Multimodal Variational Approach to Learning and Inference in Switching State Space Models," Acoustics, Speech, and Signal Processing, 2004, IEEE International Conference on Montreal, Quebec, Canada, May 17-21, 2004, vol. 5, May 17, 2005, pp. 505-508.

(Continued)

*Primary Examiner*—Patrick N. Edouard
*Assistant Examiner*—Paras Shah
(74) *Attorney, Agent, or Firm*—Theodore M. Magee; Westman, Champlin & Kelly, P.A.

(57) ABSTRACT

A method of efficiently setting posterior probability parameters for a switching state space model begins by defining a window containing at least two but fewer than all of the frames. A separate posterior probability parameter is determined for each frame in the window. The window is then shifted sequentially from left to right in time so that it includes one or more subsequent frames in the sequence of frames. A separate posterior probability parameter is then determined for each frame in the shifted window. This method closely approximates a more rigorous solution but saves computational cost by two to three orders of magnitude. Further, a method of determining the optimal discrete state sequence in the switching state space model is invented that directly exploits the observation vector on a frame-by-frame basis and operates from left to right in time.

7 Claims, 5 Drawing Sheets

OTHER PUBLICATIONS

European Search Report of European Patent 05000586.7.

L. Deng, J.Z. Ma (2000), "Spontaneous speech recognition using a statistical coarticulatory model for the vocal tract dynamics." *J. Acoust. Soc. Am.*, vol. 108, No. 6, 3036-3048.

Z. Ghahramani, G.E. Hinton (2000), "Variational learning for switching state space models," *Neural Computation*, vol. 12, 831-864.

J.D. Hamilton (1994), "A new approach to the economic analysis of nonstationary time series and the business cycle," *Econometrica*, vol. 57, 357-384.

L.J. Lee, H. Attias, L. Deng (2003), Variational inference and learning for segmental state space model for hidden speech dynamics, *Proc. ICASSP-03*.

U. Lerner, R. Parr (2001), "Inference in hybrid networks: theoretical limits and practical algorithms," *UAI-01*, 310-318.

V. Pavlovic, J. Rehg, T.-J. Cham, K. Murphy (1999), "A dynamic Bayesian network approach to figure tracking using learned dynamic models," *Proc. ICCV-99*.

European Search Report of European Patent 05000586.7, filed Jan. 13, 2005.

An Examination Report of European Patent 06013383.2, filed Jan. 13, 2005.

A Search Report of European Patent 06013383.2, filed Jan. 13, 2005.

* cited by examiner

METHOD OF SPEECH RECOGNITION USING MULTIMODAL VARIATIONAL INFERENCE WITH SWITCHING STATE SPACE MODELS

BACKGROUND OF THE INVENTION

The present invention relates to pattern recognition. In particular, the present invention relates to speech recognition.

A pattern recognition system, such as a speech recognition system, takes an input signal and attempts to decode the signal to find a pattern represented by the signal. For example, in a speech recognition system, a speech signal (often referred to as a test signal) is received by the recognition system and is decoded to identify a string of words represented by the speech signal.

Many speech recognition systems utilize Hidden Markov Models in which phonetic units, which are also referred to as acoustic units or speech units, are represented by a single tier of connected states. Using a training signal, probability distributions for occupying the states and for transitioning between states are determined for each of the phonetic units. To decode a speech signal, the signal is divided into frames and each frame is transformed into a feature vector. The feature vectors are then compared to the distributions for the states to identify a most likely sequence of HMM states that can be represented by the frames. The phonetic unit that corresponds to that sequence is then selected.

Although HMM-based recognition systems perform well in many relatively simple speech recognition tasks, they do not model some important dynamic aspects of speech directly (and are known to perform poorly for difficult tasks such as conversational speech). As a result, they are not able to accommodate dynamic articulation differences between the speech signals used for training and the speech signal being decoded.

Alternatives to HMM systems have been proposed. In particular, it has been proposed that the statistically defined trajectory or behavior of a production-related parameter of the speech signal should be modeled directly. Since the production-related values cannot be measured directly, these models are known as Hidden Dynamic Models (HDM). Hidden Dynamic Models are one example of a class of models known as switching state space models, which provide two types of hidden states. The two types of hidden states form two first order Markov chains, where the continuous chain is conditioned on the discrete one.

One problem with switching state space models is that it is difficult to train them because common training algorithms, such as the Expectation-Maximization algorithm, become intractable for switching state space models. In particular, this computation increases exponentially with each additional frame of the speech signal.

Thus, a training system is needed that allows the parameters of a switching state space dynamic model to be trained efficiently.

SUMMARY OF THE INVENTION

A method of setting posterior probability parameters for a switching state space model begins by defining a window containing at least two but fewer than all of the frames in a sequence of frames. A separate posterior probability parameter is determined for each frame in the window. The window is then shifted so that it includes one or more subsequent frames in the sequence of frames. A separate posterior probability parameter is then determined for each frame in the shifted window.

Under a further aspect of the invention, model parameters for a switching state space model are stored and a speech signal is converted into a set of observation vectors where each vector is associated with a separate frame of the speech signal. For each frame of the speech signal, a path score is determined for each path into a discrete hidden state in the frame. The path scores are then used to select a single path into each discrete hidden state of the frame.

DETAILED DESCRIPTION OF ILLUSTRATIVE EMBODIMENTS

Figure 1:
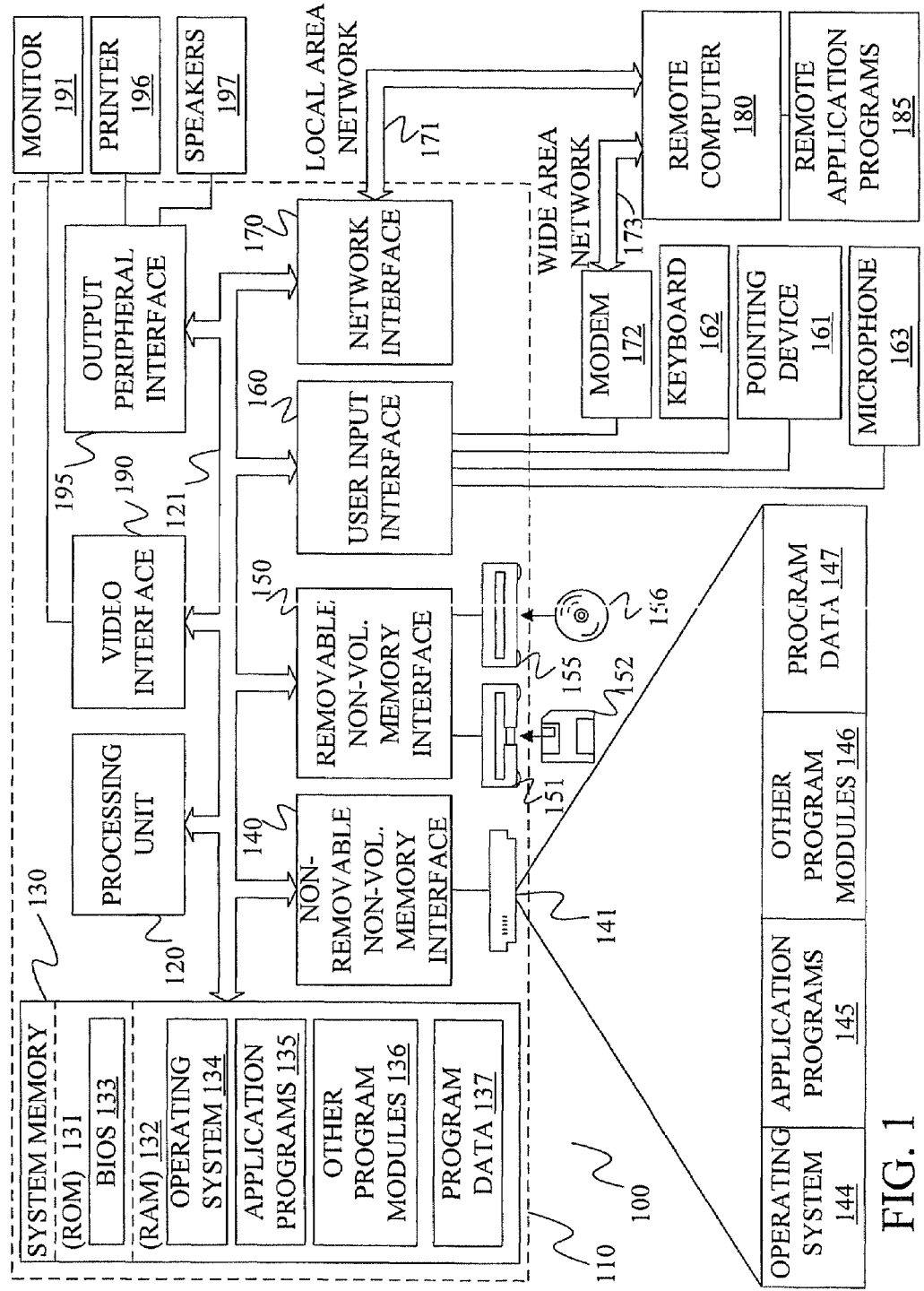
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
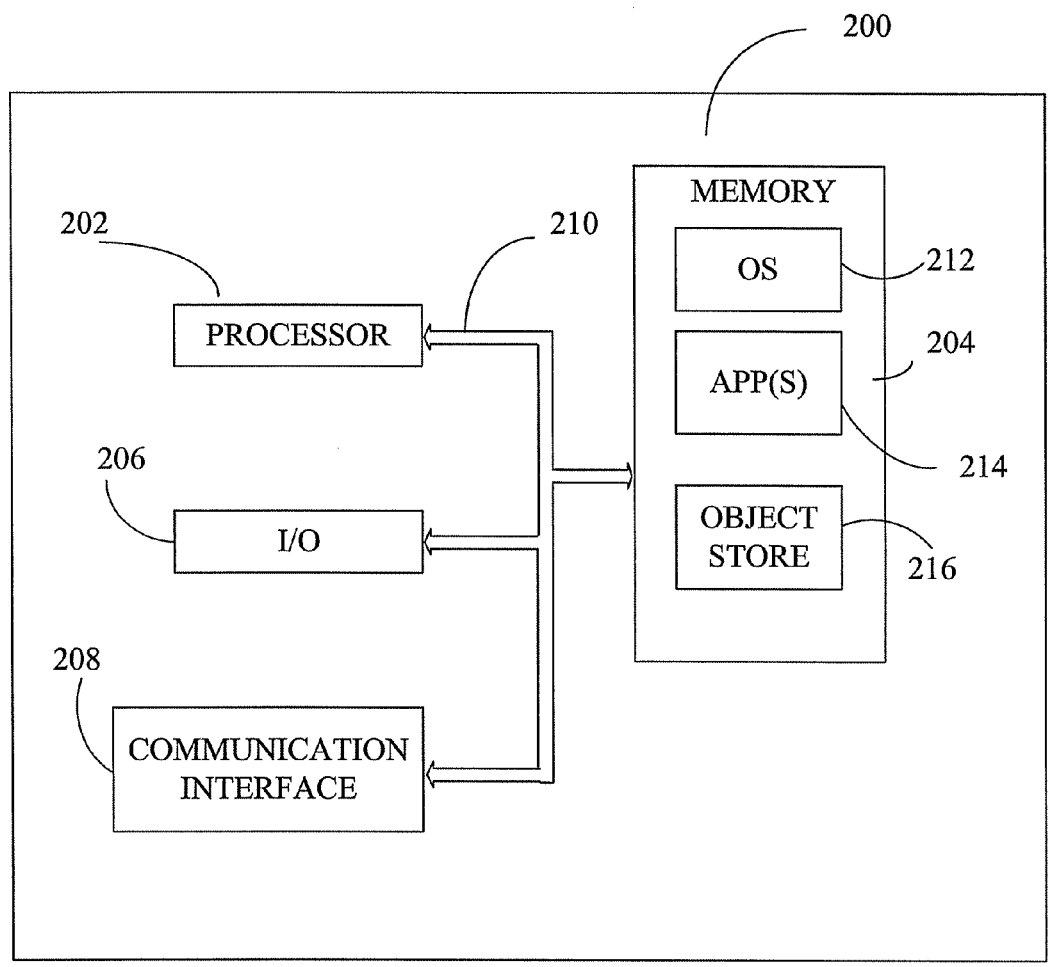
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

The present invention provides a generative model of speech. Under this model, speech is represented as the output of an attempt by the speaker to phonetically implement a linguistic definition of a sequence of speech units. During this attempt, the speaker produces a production-related value that follows a statistically defined trajectory (using the state-space formulation with recursive noise) toward a target associated with a current speech unit. Under embodiments of the present invention, this trajectory is modeled as a switching state-space model.

The model of the present invention is a special form of a Hidden Trajectory Model where the trajectory is defined recursively with noise added at each frame. This switching state-space model has two types of hidden variables (also referred to as states): discrete and continuous. The states are considered hidden because they cannot be measured directly. Each type of hidden state forms a Markov chain, where the continuous hidden state chain is conditioned on the discrete hidden state chain.

The two different types of hidden states produce a model that includes two layers, a dynamic or trajectory model component that describes hidden continuous production-related parameters (such as vocal tract resonance frequencies), and a mapping model component that translates the production-related parameters into observable acoustic features such as Mel-Frequency Cepstral Coefficients. The state equation in the state-space model predicts a sequence of continuous state values $(x_1, \ldots, x_n, \ldots, x_N)$ for a production-related parameter. The mapping model or the observation equation predicts a sequence of acoustic observation vectors $y_n$ given the sequence of continuous hidden state values.

The recursively defined trajectory and mapping models can be succinctly represented by the two equations:

$$x_n = A_s x_{n-1} + a_s + w \quad \text{Eq. 1}$$

$$y_n = C_s x_n + c_s + v \quad \text{Eq. 2}$$

where n is a frame number index, s is the hidden discrete state, which represents a speech unit, x is the hidden production-related state, y is the acoustic feature vector, $A_s$ and $C_s$ are speech-unit dependent system matrices, $a_s$ is a speech-unit dependent control input (which can be equivalently represented as a speech-unit dependent target), $c_s$ is a speech-unit dependent constant, and w and v are Gaussian noise terms.

Under one embodiment, the models of equations 1 and 2 are expressed in terms of probability distributions as:

$$p(s_n = s | s_{n-1} = s') = \pi_{ss'} \quad \text{Eq. 3}$$

$$p(x_n | s_n = s, x_{n-1}) = N(x_n | A_s x_{n-1} + a_s, B_s) \quad \text{Eq. 4}$$

$$p(y_n | s_n = s, x_n) = N(y_n | C_s x_n + c_s, D_s) \quad \text{Eq. 5}$$

with initial conditions:

$$p(s_0 = s) = \pi_s^0$$

$$p(x_0 | s_0 = s) = N(x_0 | a_s^0, B_s^0)$$

where $B_s$, $B_s^0$, and $D_s$ are precision matrices (the inverse of a covariance matrix), which are based on a variance associated with noise terms w and v.

In general, training the model parameters of equations 3-5 requires an iterative two-step process. The first step is known as inference, during which a posterior distribution $p(s_{1:N}, x_{1:N} | y_{1:N})$ is calculated given an initial set of model parameters. During the second step, known as learning or parameter estimation, the model parameters are updated. These steps are repeated until the model parameters converge or some maximum number of iterations is reached. When performing generalized Expectation Maximization training, the E-step is the inference step and the M-step is the learning step.

The inference step cannot be performed directly for the models of Equations 3-5 because the posterior calculation is intractable. One embodiment of the present invention overcomes this problem by approximating the posterior distribution using HMM posteriors. Specifically, the posterior $p(s_{1:N}, x_{1:N} | y_{1:N})$ is approximated using an HMM posterior defined as:

$$q(s_{1:N}, x_{1:N} | y_{1:N}) = \prod_{n=1}^{N} q(x_n | s_n, y_{1:N}) \cdot q(s_n | s_{n-1}, y_{1:N}) \cdot q(x_0 | s_0, y_{1:N}) q(s_0 | y_{1:N}) \quad \text{Eq. 6}$$

By minimizing a divergence between the approximation and the actual posterior distribution, the present inventors have found that the probability $q(x_n | s_n, y_{1:N})$ follows a Gaussian distribution:

$$q(x_n | s_n, y_{1:N}) = N(x_n | \rho_{s,n}, \Gamma_{s,n}) \quad \text{Eq. 7}$$

where the mean $\rho_{s,n}$ and the precision $\Gamma_{s,n}$ are given by:

$$\Gamma_{s,n} = C_s^T D_s C_s + B_s + \sum_{s'} \eta_{s's,n+1} A_{s'}^T B_{s'} A_{s'} \quad \text{Eq. 8}$$

$$\Gamma_{s,n}\rho_{s,n} = B_s \left( A_s \sum_{s'} \overline{\eta}_{s's,n-1}\rho_{s',n-1} + a_s \right) + \quad \text{Eq. 9}$$

$$\sum_{s'} \eta_{s's,n+1} A_{s'}^T B_{s'} (\rho_{s',n+1} - a_{s'}) +$$

$$C_s^T D_s (y_n - c_s)$$

where $\overline{\eta}_{s's,n-1}$ is a posterior transition probability for transitioning from state s' at time n−1 to state s at time n given state s at time n: $\eta_{s's,n-1} = q(s_{n-1}=s'|s_n=s,y_{1:N})$, and $\eta_{s's,n+1}$ is a posterior transition probability for transitioning from state s at time n to state s' at time n+1 $\eta_{s's,n+1} = q(s_{n+1}=s'|s_n=s,y_{1:N})$.

The posterior transition probabilities are computed recursively by a backward pass described for n=N, ..., 1:

$$z_{s,n} = \sum_{s'} \exp(f_{ss',n}) z_{s',n+1} \quad \text{Eq. 10}$$

$$\eta_{ss',n} = \frac{1}{z_{s,n}} \exp(f_{ss',n}) z_{s',n+1} \quad \text{Eq. 11}$$

For $n = 0$:

$$z_0 = \sum_s \exp(f_{s,0}) z_{s,1} \quad \text{Eq. 12}$$

where:

$$f_{s's,n} = \frac{1}{2} \left\{ \log \left| \frac{D_s}{2\pi} \right| - \langle C_s^T D_s C_s, \Gamma_{s,n}^{-1} + \rho_{s,n}\rho_{s,n}^T \rangle - \quad \text{Eq. 13} \right.$$

$$2(c_s - y_n)^T D_s C_s \rho_{s,n} -$$

$$(c_s - y_n)^T D_s (c_s - y_n) -$$

$$\log \left| \frac{\Gamma_{s,n}}{2\pi} \right| + \langle \Gamma_{s,n}, \Gamma_{s,n}^{-1} + \rho_{s,n}\rho_{s,n}^T \rangle -$$

$$\rho_{s,n}^T \Gamma_{s,n} \rho_{s,n} + \log \left| \frac{B_s}{2\pi} \right| -$$

$$\langle A_s^T B_s A_s, \Gamma_{s',n-1}^{-1} + \rho_{s',n-1}\rho_{s',n-1}^T \rangle -$$

$$2(a_s - \rho_{s,n})^T B_s A_s \rho_{s',n-1} -$$

$$\langle B_s, \Gamma_{s,n}^{-1} + \rho_{s,n}\rho_{s,n}^T \rangle +$$

$$\left. 2a_s^T B_s \rho_{s,n} - a_s^T B_s a_s + 2\log \pi_{s's} \right\}$$

$$f_{s,0} = \frac{1}{2} \left\{ \log \left| \frac{D_s}{2\pi} \right| - \langle C_s^T D_s C_s, (B_s^0)^{-1} + a_s^0(a_s^0)^T \rangle - \quad \text{Eq. 14} \right.$$

$$\log \left| \frac{(B_s^0)^{-1}}{2\pi} \right| + \langle B_s^0, (B_s^0)^{-1} + a_s^0(a_s^0)^T \rangle -$$

$$(a_s^0)^T B_s^0 a_s^0 + \log \left| \frac{B_s}{2\pi} \right| -$$

$$\langle B_s, (B_s^0)^{-1} + a_s^0(a_s^0)^T \rangle +$$

$$\left. 2a_s^T B_s a_s^0 - a_s^T B_s a_s + 2\log \pi_s^0 \right\}$$

where < > denotes a scalar obtained by summing up the element-wise product of two equal-sized vectors or matrices, and s' is an index for speech units for the summations.

Because the computation of a current $\rho_{s,n}$ in equation 9 is dependent on $\rho_{s,n-1}$ at a previous time point n−1 and $\rho_{s,n+1}$ at a next time point n+1, a solution of a set of simultaneous equations that cover values for $\rho_{s,n}$ across all frames was needed to compute the values. This would typically be done by organizing the sets of equations into a matrix form and performing a matrix inversion. This computation has a complexity of order $O((NS)^3)$, where N is the number of time points and S is the number of possible states at each time point. For any reasonable speech signal, this computation becomes so time-consuming that it cannot be performed in a practical system.

Figure 3:
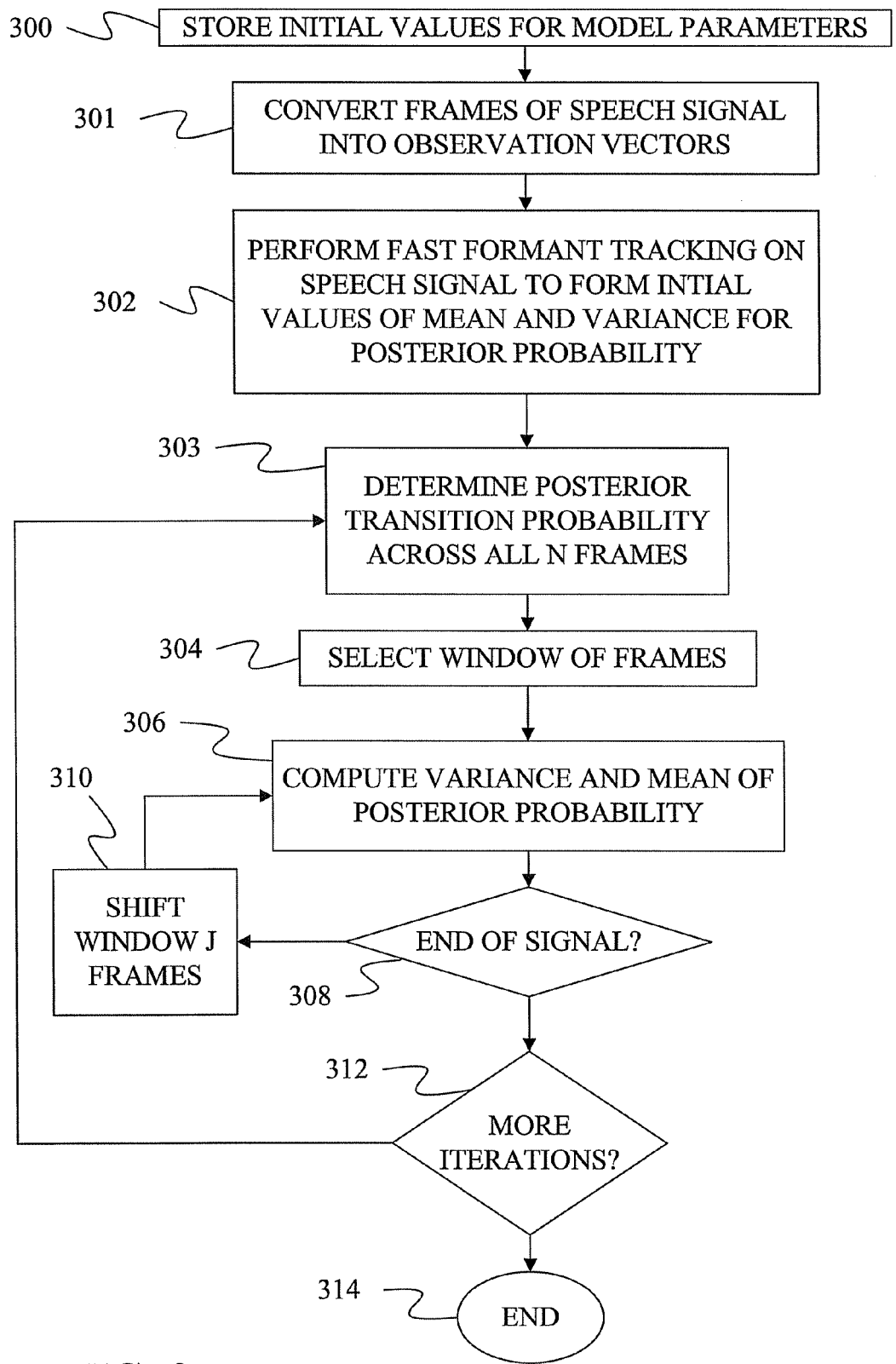
FIG. 3 is a flow diagram of a method for setting posterior probability parameters using overlapping windows under an embodiment of the present invention.

A method of reducing the complexity of this computation under the present invention is shown in the flow diagram of FIG. 3. At step 300 of FIG. 3, initial values for the model parameters are stored. These initial values may be set randomly or based on a reasonable estimate given known characteristics of formants and the expected relationship between formants and observation vectors. At step 301, frames of the speech signal are converted into observation vectors. At step 302, a fast formant tracker is used to establish an initial estimate of $\rho_{s,n}$ for each of the frames of the speech signal. Note that each initial $\rho_{s,n}$ at a time point n is the same for all of the states s. This embodiment uses a formant tracker for the initial estimates based on the assumption that the hidden production-related parameter is a Vocal Track Resonance value, which is similar to a formant. When the hidden production-related parameter is a different type of value, different techniques can be used to estimate initial values for $\rho_{s,n}$.

Figure 4:
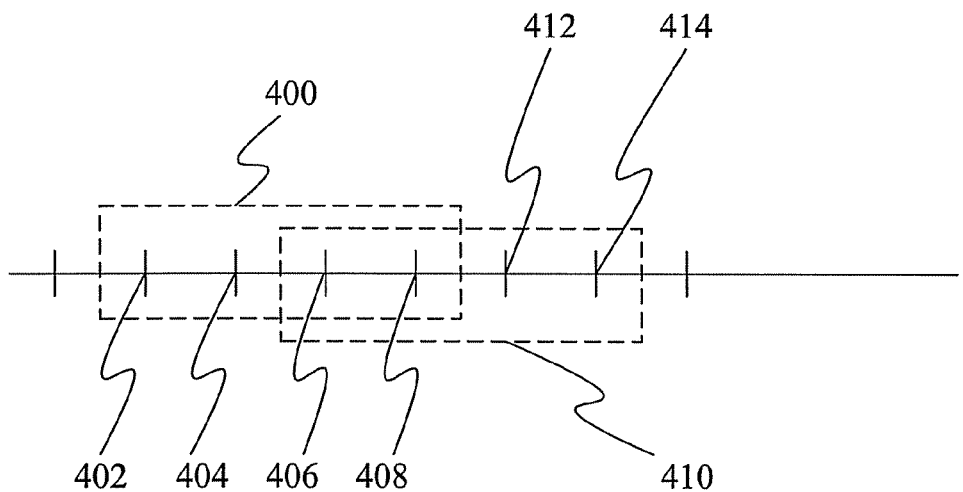
FIG. 4 is a graph showing overlapping windows under an embodiment of the present invention.

At step 303, the initial values for $\rho_{s,n}$ are used to determine the posterior transition probabilities using equations 10-12. Once the transition probabilities have been determined, a window of M frames of the speech signal is selected at step 304, beginning from the second frame in the speech signal, where M is less than the total number of frames N. FIG. 4 shows an example of a window 400 that includes frames 402, 404, 406, and 408.

At step 306, $\Gamma_{s,n}$ and $\rho_{s,n}$ are computed for each state s at each frame n within the window of M frames. To make this computation, a value of $\rho_{s,n}$ is needed for the frame before the window and the frame after the window. For the first window, both of these values are taken from the initial estimate of $\rho_{s,n}$ produced by the formant tracker. For every window after the first window, the value of $\rho_{s,n}$ for the frame before the window is taken from the computation performed for the previous window. The value of $\rho_{s,n}$ for the frame after the window continues to be taken from the initial values determined by the formant tracker.

Because the window is much smaller than the entire speech signal, this computation takes much less time than prior computations that spanned the entire speech signal. Under one embodiment, this computation involves solving a set of simultaneous equations using matrix inversion.

After the values of $\Gamma_{s,n}$ and $\rho_{s,n}$ have been determined for every frame in the window, the process determines if there are any more frames to be processed at step 308. If there are more frames, the window is shifted by J frames at step 310. The process then returns to step 306 to compute the values of $\Gamma_{s,n}$ and $\rho_{s,n}$ for the M frames covered by the shifted window.

In FIG. 4, an example of a shifted window is shown as window 410, which spans frames 406, 408, 412, and 414. Note that in this embodiment, shifted window 410 partially overlaps window 400. This helps to reduce discontinuities in the value of $\rho_{s,n}$ and $\Gamma_{s,n}$.

Because the values of $\rho_{s,n}$ are dependent on the transition probabilities and the values of the transition probabilities are dependent on $\rho_{s,n}$, under some embodiments of the present invention, several iterations are performed where the values of the transition probabilities are updated at step 302 based on the new $\rho_{s,n}$ and then the values of $\rho_{s,n}$ are updated at step 306 based on the updated transition probabilities. At step 312, the process determines if another iteration of updating these values should be performed. If an additional iteration is needed, the process returns to step 302. When no more iterations are needed, the process ends at step 314.

The computation performed by the process of FIG. 3 is much more efficient than previous techniques for computing $\rho_{s,n}$. Specifically, the process of FIG. 3 has a computational complexity of order $O((MS)^2N/J)$, which is much less than the complexity of $O((NS)^3)$ found in the prior art.

After the inference step is complete, the values for $\Gamma_{s,n}$, and $\rho_{s,n}$ are used in the learning step to set the values of model parameters $\Theta = \{\pi_{ss'}, A_{1:S}, a_{1:S}, B_{1:S}, C_{1:S}, c_{1:S}, D_{1:S}\}$ according to:

$\pi_{s's}$ is set by a separately trained language model, or a phonotactic model which describes how different phones may be followed one after another. This model may be made uniform if no such knowledge is available.

$$A_s = \left[\frac{1}{\sum_n \gamma_{s,n}}\left(\sum_n \gamma_{s,n}\rho_{s,n}\right)\left(\sum_n \sum_{s'} \eta_{s's,n}\gamma_{s',n-1}\rho_{s',n-1}\right)^T - \sum_n \rho_{s,n}\sum_{s'} \eta_{s's,n}\gamma_{s',n-1}\rho^T_{s',n-1}\right]$$

$$\left[\frac{1}{\sum_n \gamma_{s,n}}\left(\sum_n \sum_{s'} \eta_{s's,n}\gamma_{s',n-1}\rho_{s',n-1}\right)\left(\sum_n \sum_{s'} \eta_{s's,n}\gamma_{s',n-1}\rho_{s',n-1}\right)^T - \sum_n \sum_{s'} \eta_{s's,n}\gamma_{s',n-1}(\Gamma^{-1}_{s',n-1} + \rho_{s',n-1}\rho^T_{s',n-1})\right]^{-1}$$

Eq. 15

$$a_s = \frac{1}{\sum_n \gamma_{s,n}}\left(\sum_n \gamma_{s,n}\rho_{s,n} - A_s\sum_n\sum_{s'}\eta_{s's,n}\gamma_{s',n-1}\rho_{s',n-1}\right)$$

Eq. 16

$$B_s^{-1} = \frac{1}{\sum_n \gamma_{s,n}}\left\{\sum_n \gamma_{s,n}(\Gamma^{-1}_{s,n} + \rho_{s,n}\rho^T_{s,n}) - \left[\sum_n \rho_{s,n}\left(\sum_{s'}\eta_{s's,n}\gamma_{s',n-1}\rho_{s',n-1}\right)^T\right]A_s^T - \left(\sum_n \gamma_{s,n}\rho_{s,n}\right)a_s^T - A_s\left[\sum_n \gamma_{s,n}\right] \right.$$

$$\left(\sum_{s'}\eta_{s's,n}\gamma_{s',n-1}\rho_{s',n-1}\right)\rho^T_{s,n}\right] +$$

$$A_s\left[\sum_n\sum_{s'}\eta_{s's,n}\gamma_{s',n-1}(\Gamma^{-1}_{s',n-1} + \rho_{s',n-1}\rho^T_{s',n-1})\right]A_s^T +$$

$$A_s\left(\sum_n\sum_{s'}\eta_{s's,n}\gamma_{s',n-1}\rho_{s',n-1}\right)a_s^T -$$

$$a_s\left(\sum_n \gamma_{s,n}\rho_{s,n}\right)^T +$$

$$a_s\left[\sum_n\left(\sum_{s'}\eta_{s's,n}\gamma_{s',n-1}\rho_{s',n-1}\right)^T\right]$$

$$A_s^T\} + a_s a_s^T$$

Eq. 17

-continued $$C_s = \left[\frac{1}{\sum_n \gamma_{s,n}}\left(\sum_n \gamma_{s,n}y_n\right)\left(\sum_n \gamma_{s,n}\rho_{s,n}\right)^T - \sum_n \gamma_{s,n}y_n\rho^T_{s,n}\right]$$

$$\left[\frac{1}{\sum_n \gamma_{s,n}}\left(\sum_n \gamma_{s,n}\rho_n\right)\left(\sum_n \gamma_{s,n}\rho_{s,n}\right)^T - \sum_n \gamma_{s,n}(\Gamma^{-1}_{s,n} + \rho_{s,n}\rho^T_{s,n})\right]^{-1}$$

Eq. 18

$$c_s = \frac{1}{\sum_n \gamma_{s,n}}\left(\sum_n \gamma_{s,n}y_n - C_s\sum_n \gamma_{s,n}\rho_{s,n}\right)$$

Eq. 19

$$D_s^{-1} = \frac{1}{\sum_n \gamma_{s,n}}\left\{\sum_n \gamma_{s,n}y_n y_n^T - \left(\sum_n \gamma_{s,n}y_n\rho^T_{s,n}\right)C_s^T - \left(\sum_n \gamma_{s,n}y_n\right)c_s^T - C_s\left(\sum_n \gamma_{s,n}y_n\rho^T_{s,n}\right)^T + C_s\left[\sum_n \gamma_{s,n}(\Gamma^{-1}_{s,n} + \rho_{s,n}\rho^T_{s,n})\right]\right.$$

$$C_s^T + C_s\left(\sum_n \gamma_{s,n}\rho_{s,n}\right)c_s^T - c_s\left(\sum_n \gamma_{s,n}y_n\right)^T +$$

$$c_s\left(\sum_n \gamma_{s,n}\rho_{s,n}\right)^T C_s^T\right\} + c_s c_s^T$$

Eq. 20 where $\gamma_{s,n}$ is determined recursively by a forward pass:

$$\gamma_{s,n} = \sum_{s'} \eta_{ss',n}\gamma_{s',n-1}$$

Eq. 21

The inference and learning steps may be iterated several times to complete the training.

Speech Recognition

After the model parameters have been trained, the model parameters and the approximations can be used to perform speech recognition. This involves identifying a most likely sequence of speech units, such as phones, given a sequence of observation feature vectors that represent a speech signal.

In the past, speech recognition has required the determination of $\gamma_{s,n}$, which provides the probability of a state at time n across the entire speech segment, requiring a backward-forward recursion. As a result, speech recognition could not be implemented directly in a Viterbi decoder as the frames of speech were received. In Viterbi decoding, a path score is generated for each path into a state at frame n. The path with the highest path score into a state is retained and the remaining paths into that state are pruned from further consideration. Under one embodiment of the present invention, a new formulation for a path score is provided that allows speech to be decoded without explicitly or directly requiring the determination of $\gamma_{s,n}$.

The path score under the present invention is built based on the discovery by the present inventors that:

$$\tilde{p}(y_n|s_n=s', s_{n-1}=s) = e^{f_{s's,n}}/\pi_{s's}$$

Eq. 22

$$\tilde{p}(s_n=s'|s_{n-1}=s) = \pi_{s's}$$

Eq. 23

Equations 22 and 23 can be combined to form a path score for entering state s from state s' that is defined as:

$$\text{Path\_Score} = e^{f_{s',s,n}}$$ Eq. 24

Figure 5:
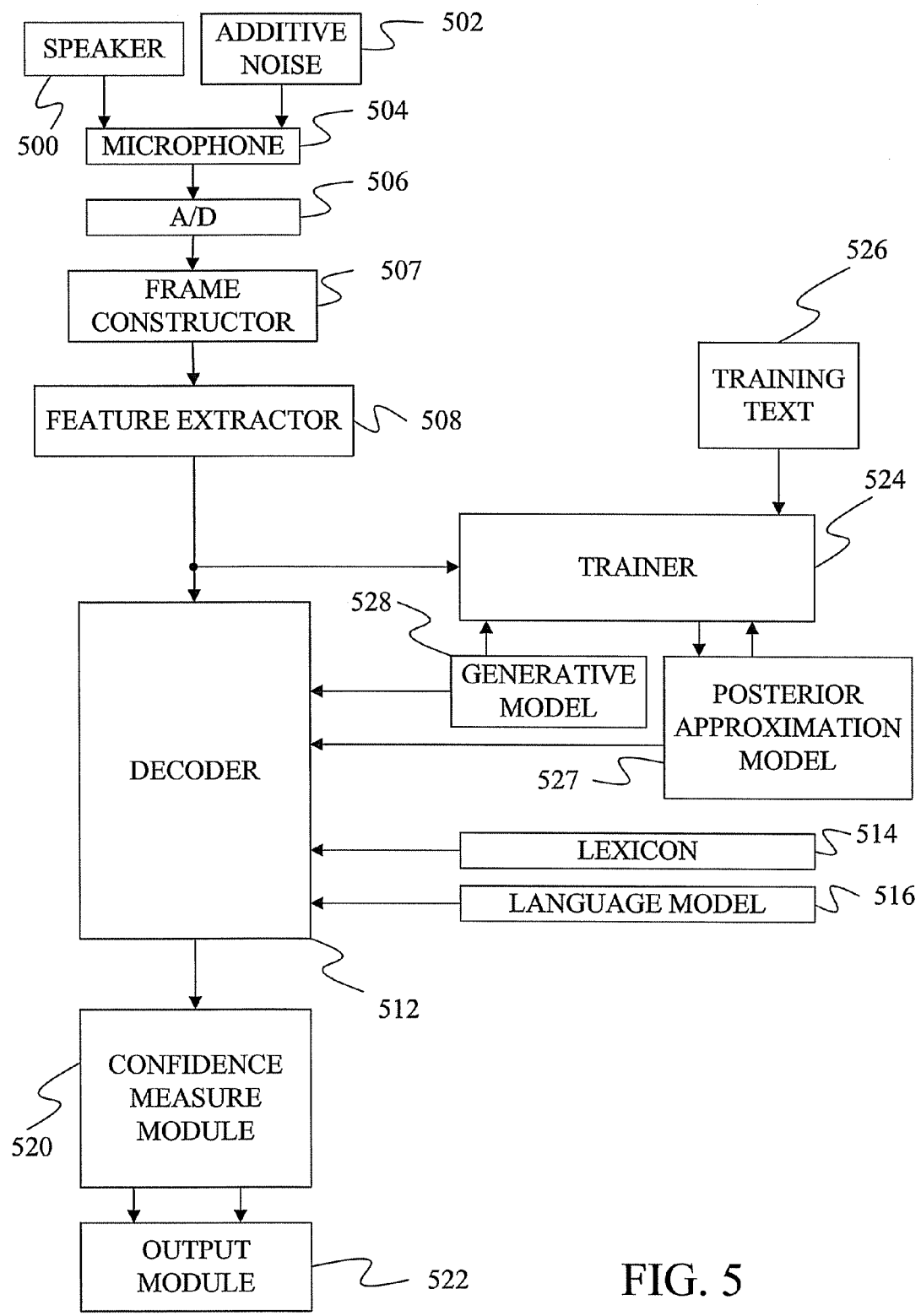
FIG. 5 is a block diagram of a speech recognition system under one embodiment of the present invention.

FIG. 5 provides a block diagram of a speech recognition system in which this path score is used. In FIG. 5, the generative model parameters determined through the training process discussed above are stored as a generative model 528.

Recognition begins when a speaker 500 speaks into a microphone 504. Microphone 504 also receives additive noise from one or more noise sources 502. The audio signals detected by microphone 504 are converted into electrical signals that are provided to analog-to-digital converter 506.

A-to-D converter 506 converts the analog signal from microphone 504 into a series of digital values. In one embodiment, A-to-D converter 506 samples the analog signal at 16 kHz and 16 bits per sample, thereby creating 32 kilobytes of speech data per second. These digital values are provided to a frame constructor 507, which, in one embodiment, groups the values into 25 millisecond frames that start 10 milliseconds apart.

The frames of data created by frame constructor 507 are provided to feature extractor 508, which extracts a feature from each frame. Examples of feature extraction modules include modules for performing Linear Predictive Coding (LPC), LPC derived cepstrum, Perceptive Linear Prediction (PLP), auditory model feature extraction, and Mel-Frequency Cepstrum Coefficients (MFCC) feature extraction. Note that the invention is not limited to these feature extraction modules and that other modules may be used within the context of the present invention.

The series of feature vectors is provided to a trainer 524, which sequentially determines sets of $\Gamma_{s,n}$ and $\rho_{s,n}$, each set associated with an overlapping window as shown in FIG. 4. Specifically, trainer 524 uses the parameters of generative model 528 in equations 8 and 9 above and the observation vectors for the frames found in the current position of the window. Observation vectors for frames after the window are not used to determine the values of $\Gamma_{s,n}$ and $\rho_{s,n}$ for frames in the window. For frames that are found in more than one window, the calculation for the last window in which the frame is found is used as the value of $\Gamma_{s,n}$ and $\rho_{s,n}$ for that frame. In the calculation of Equations 8 and 9, the posterior transition probabilities are set by Equations 10-12. Using the windowing technique, the current system can approximately operate sequentially in time.

Once the values of $\Gamma_{s,n}$ and $\rho_{s,n}$ have been determined for a frame, they are placed in posterior approximation model 527. Decoder 512 then identifies a most likely sequence of words based on the stream of feature vectors, a lexicon 514, a language model 516, approximation model 527 and generative model 528.

In particular, decoder 512 uses the path score of Equation 24 to determine and select a most likely path into each state for each frame in the current window that will not be overlapped by the next window. Since this type of Viterbi decoding is commonly used with HMM systems of the prior art, the decoder of the present invention is able to take advantage of techniques that have been developed to improve the efficiency of Viterbi decoding including various pruning techniques for pruning the most likely path into some of the states, thereby reducing the number of path scores that must be determined. In other words, the pruning removes the best path that was selected for some of the states, thereby producing states that do not have paths into them.

The most probable sequence of hypothesis words is provided to a confidence measure module 520. Confidence measure module 520 identifies which words are most likely to have been improperly identified by the speech recognizer, based in part on a secondary acoustic model (not shown). Confidence measure module 520 then provides the sequence of hypothesis words to an output module 522 along with identifiers indicating which words may have been improperly identified. Those skilled in the art will recognize that confidence measure module 520 is not necessary for the practice of the present invention.

Although the present invention has been described with reference to particular embodiments, workers skilled in the art will recognize that changes may be made in form and detail without departing from the spirit and scope of the invention.

What is claimed is:

1. A method of setting posterior probability means for posterior probability distributions in a switching state space model, the posterior probability providing the likelihood of a set of hidden states for a sequence of frames based upon input values associated with the sequence of frames, the method comprising:
   inputting a speech signal
   identifying input values of a sequence of frames from the speech signal
   defining a window containing at least two but fewer than all of the frames in the sequence of frames;
   determining a separate posterior probability mean for each frame in the window each posterior probability mean providing a mean value for a continuous hidden state given at least an input value wherein determining a separate posterior probability mean for each frame further comprises determining a separate posterior probability mean: for each of a set of discrete hidden states that are different from the continuous hidden states:
   shifting the window so that it includes at least one subsequent frame in the sequence of frames to form a shifted window; and
   determining a separate posterior probability mean for each frame in the shifted window; and
   using the posterior probability means to decode a speech signal.

2. The method of claim 1 wherein the shifted window includes at least one frame that was present in the window before shifting.

3. The method of claim 1 wherein determining a separate posterior probability mean for each frame in a window comprises solving a set of simultaneous equations for all of the frames in the window.

4. The method of claim 1 wherein the posterior probability provides the probability of a continuous hidden state given a discrete hidden state and an input value.

5. The method of claim 1 further comprising before shifting the window, using the posterior probability mean determined for the frame to generate a path score for entering a discrete hidden state during the frame.

6. The method of claim 5 wherein generating the path score comprises generating the path score as part of a Viterbi decoder.

7. A method of decoding a speech signal to identify a sequence of phonetic units, the method comprising:
   storing model parameters for a switching state space model in which there are discrete hidden states and continuous hidden states, the continuous hidden states being dependent on the discrete hidden states,
   converting the speech signal into a set of observation vectors, each observation vector associated with a separate frame of the speech signal;

for each frame of the speech signal:
- determining a posterior probability mean for each discrete hidden state, the posterior probability mean defining a mean value for a continuos hidden state given a discrete hidden state and an observation vector wherein determining a posterior probability mean comprises defining a window of frames that contains fewer than all of the frames of the speech signal and determining a separate posterior probability mean for each discrete hidden state in each frame in the window by solving a set of simultaneous equations; and
- determining a path score for at least one path into each discrete hidden state in the frame based on the posterior probability mean for the respective discrete hidden state; and using the path score to select a single path into each discrete hidden state of the frame.

* * * * *